(12) United States Patent
Berrang et al.

(10) Patent No.: US 12,486,866 B2
(45) Date of Patent: Dec. 2, 2025

(54) RADIAL AIR BEARING DEVICE

(71) Applicant: BorgWarner Inc., Auburn Hills, MI (US)

(72) Inventors: Marcel Berrang, Schweisweiler (DE); Sebastian Mack, Bubenheim (DE)

(73) Assignee: BorgWarner Inc., Auburn Hills, MI (US)

( * ) Notice: Subject to any disclaimer, the term of this patent is extended or adjusted under 35 U.S.C. 154(b) by 85 days.

(21) Appl. No.: 18/524,797

(22) Filed: Nov. 30, 2023

(65) Prior Publication Data

US 2024/0183386 A1 Jun. 6, 2024

(30) Foreign Application Priority Data

Dec. 2, 2022 (DE) .......................... 102022132064.2

(51) Int. Cl.
*F16C 17/02* (2006.01)
(52) U.S. Cl.
CPC .................. *F16C 17/024* (2013.01)
(58) Field of Classification Search
CPC .... F16C 17/024; F16C 2226/76; F16C 43/02; F16C 27/02
See application file for complete search history.

(56) References Cited

U.S. PATENT DOCUMENTS 3,635,534 A * 1/1972 Barnett ................. F16C 17/042
384/106
9,206,840 B2 12/2015 Omori

FOREIGN PATENT DOCUMENTS

| CN | 110594286 A | * | 12/2019 | ............ F16C 17/024 |
| JP | 2012013218 A | * | 1/2012 | |
| JP | 2021165576 A | * | 10/2021 | |
| KR | 20070012591 A | | 1/2007 | |

OTHER PUBLICATIONS

English language abstract and machine-assisted English translation for KR 20070012591 A extracted from espacenet.com database on Dec. 4, 2023, 6 pages.

\* cited by examiner

*Primary Examiner* — John Olszewski
*Assistant Examiner* — Aimee Tran Nguyen
(74) *Attorney, Agent, or Firm* — Howard & Howard Attorneys PLLC (57) ABSTRACT

A radial air bearing device includes a receptable and top and bump foils. The receptacle comprises a first end side, which contains a first depression, and a second end side and also a cutout with an inner wall. The cutout and the inner wall extend between the first and second end sides. The top foil is arranged along the inner wall and includes a first longitudinal side adjacent the first end side and a second longitudinal side adjacent the second end side. The bump foil is arranged between the top foil and the inner wall and includes a first longitudinal side adjacent the first end side and a second longitudinal side adjacent the second end side. At least one foil from the top and bump foils includes a holding lug which is on a longitudinal side, is bent in relation to the first end side, and engages in the first depression.

19 Claims, 7 Drawing Sheets

RADIAL AIR BEARING DEVICE

CROSS-REFERENCE TO RELATED APPLICATIONS

This application claims priority pursuant to 35 U.S.C. 119(a) to German Patent Application No. 102022132064.2 filed Dec. 2, 2022, which application is incorporated herein by reference in its entirety.

TECHNICAL FIELD

The invention relates to a radial air bearing device.

BACKGROUND

A radial air bearing device is used in the case of rotating components with very high speeds, for example exhaust-gas turbochargers, electrically driven superchargers and superchargers for fuel cells in vehicles.

A radial air bearing device with a radial air bearing comprises an inner top foil, which is arranged for example around a shaft as rotating component. A bump foil, which surrounds the top foil and presses the top foil against the outer surface of the shaft owing to its spring tension in the inactive state, is provided between the top foil and a bearing sleeve.

If the shaft begins to rotate, an air cushion begins to build up between an outer surface of the shaft and an inner surface of the top foil, so that the top foil lifts off from the shaft counter to the pressure of the bump foil and therefore the rotating shaft is mounted in a virtually wear-free manner by way of the air cushion. The top foil and the bump foil may in this respect be arranged in an outer bearing sleeve or, for example in the case of superchargers, directly in a supercharger housing without provision of an additional bearing sleeve.

It is possible to provide multiple top foils and bump foils, with the result that they form multiple, for example three, foil portions, in the form of segments, of the bearing and the shaft is encircled by the foil portions. The end regions of the foils are secured in elongate axial slots in the bearing sleeve or the bearing housing. The slots may have an angled cross section in order to improve the securing. A securing means that prevents axial displacement of the foils is not provided.

Documents U.S. Pat. No. 9,206,840 B2 and KR 1020070012591 disclose radial air bearings.

SUMMARY

The object is to provide an improved radial air bearing device.

The object is achieved by a radial air bearing device having the features of claim 1.

The radial air bearing device comprises a bearing receptacle comprising a first end side, which contains a first depression, and a second end side and also a cutout with an inner wall, wherein the cutout and the inner wall extend between the first and the second end side. A top foil is arranged along the inner wall and comprises a first longitudinal side adjacent to the first end side and a second longitudinal side adjacent to the second end side. A bump foil is arranged between the top foil and the inner wall and comprises a first longitudinal side adjacent to the first end side and a second longitudinal side adjacent to the second end side. At least one foil from the group comprising the top foil and the bump foil comprises a first holding lug on a longitudinal side which is bent in relation to the first end side and engages in the first depression.

The radial air bearing device is a simpler foil air bearing, in the case of which axial and rotational displacements of the foils are prevented.

The bent holding lug is a lateral tab on the foil that engages in the depression on the first end side and as a result form-fittingly secures the foil against axial and rotational displacement. The depression blocks a rotational movement of the engaging holding lug and thus of the foil. The holding lug resting on the end side blocks an axial foil movement and prevents the foil from slipping out. The first holding lug may be provided on the top foil or on the bump foil or on both. In one embodiment, the foil has a rectangular basic shape with parallel longitudinal sides and parallel transverse sides. Advantageously, the first holding lug is provided on the first longitudinal side. It may extend radially and/or axially over the longitudinal side.

Advantageously, the at least one foil comprises a second holding lug which is on a longitudinal side and is bent in relation to the second end side. In one embodiment, the second holding lug is provided on the second longitudinal side. It may extend radially and/or axially over the longitudinal side. A further, second depression in which the second holding lug engages may be provided on the second end side. As an alternative, no depression is provided in the second end side, so that the second holding lug is prevented from rotationally moving by friction. The interaction of depressions and holding lugs engaging in them secures the foil against rotation. Axial movement is prevented by the holding lugs on the end sides.

The depressions are axial recesses on the end sides of a bearing receptacle, which is for example in the form of a radial bearing bush, and are less complex and thus less expensive to manufacture than conventional slots with an angled cross section. The cost saving of such trench-like depressions on the end sides can be in the region of 20%. This makes series manufacture more feasible, since the production process is easier. Conventional bearing bushes can be replaced by such groove-like trenches on the end side.

It is possible to provide multiple top foils and bump foils, with the result that they form multiple foil portions, in the form of segments, of the bearing and the shaft is encircled by the foil portions. One exemplary embodiment has three top foils and three bump foils, each of which extends approximately over 120 degrees of the circumference. The top foils may be part of a top foil arrangement which is formed in one piece and comprises multiple top foils. The bump foils may be part of a bump foil arrangement which is formed in one piece and comprises multiple bump foils. The foils of the top and/or bump foil arrangement are arranged angularly offset on the inner wall of the cutout and connected by a flange. In one embodiment, the flange extends adjacent to, but not on, the inner wall, but rather outside the cutout. In one embodiment, a top foil arrangement with multiple separate bump foils is provided.

In one embodiment, the first holding lug has a bend point at which an end region of the first holding lug is bent at right angles or an acute angle in relation to the first end side. The end region may, but does not have to, rest on the first end side in the depression. It may rest by way of a main side of the end region or by way of a front edge at the tip of the end region. In addition or alternatively, the second holding lug has a bend point at which an end region of the second holding lug is bent at right angles or an acute angle in relation to the second end side. The end region may, but does not have to, rest on the second end side, in particular in the second depression. It may rest by way of a main side of the end region or by way of a front edge at the tip of the end region. The bend points may have been formed after the top foil and the bump foil are inserted in the cutout by bending the holding lugs. In such an embodiment, the angle at the bend point is usually a right angle.

As an alternative, the bend point may have been formed already before the foils are mounted. In such an embodiment, the first and/or the second holding lug is in the form of an elastically deformable clip, with the result that it is deformed upon insertion into the bearing receptacle. In one embodiment, in the mounted state, the elastically deformable first holding lug is then pretensioned such that it presses against the first end side owing to its restoring force. As an alternative or in addition, the second holding lug is elastically deformable, with the result that it can be deformed upon insertion into the bearing receptacle. In one embodiment, the second holding lug is pretensioned such that, in the mounted state, it presses against the second end side owing to its restoring force. In alternative embodiments, when they have been inserted and although they were elastically deformed upon insertion, the first and/or the second holding lug return to a state relieved of tension.

The bend point may be arranged directly on the longitudinal side of the foil, or spaced apart therefrom. In the latter case, the holding lug has a region close to the bearing receptacle, and the bend point is provided between the end region and the region close to the bearing receptacle. There is a more acute angle between the end region and the region close to the bearing receptacle when relieved of tension, that is to say in the not-yet mounted state of the holding lug, than when the holding lug has been inserted in the bearing receptacle, when the holding lug is deformed.

In one embodiment, the region of the second holding lug that is close to the bearing receptacle is longer than the region of the first holding lug that is close to the bearing receptacle. This asymmetry facilitates the mounting. When the foil is being axially pushed into the cutout with the second longitudinal side leading, the second holding lug is folded on itself when the end region is moved over the inner wall. After the compressed second holding lug has been moved over the edge of the second end side, the second holding lug unfolds and the end region is at an acute angle on the second end side. This makes it possible to move the foil back slightly axially into its final position. Moving the second holding lug over the edge until it unfolds involves an elastic deformation of the first holding lug, the bent end region of which is unfolded, with the result that the angle increases. In the final position, the first and the second holding lug rest on the end sides under pretension. The elastically deformable holding lugs with the clip function described above facilitate the mounting compared to the introduction of conventional foils into axial slots, since only the foil is pushed into the bearing receptacle, and then the holding lugs unfold and thereby secure the foil.

In one embodiment, the second longitudinal side of the at least one foil is connected to an annular flange which projects beyond the second end side and on which advantageously the second holding lug is formed. The foil and the flange are part of a foil arrangement. The foil arrangement may comprise multiple foils fastened to the flange with an angular offset. For example, three foils arranged on the annular flange with an offset of 120 degrees may be provided. The flange extends along the second longitudinal sides of the foils. A gap bridged by the second holding lugs is provided between the flange and the longitudinal sides.

The second holding lugs form the connection points between the foils and the flange. The foil arrangement may be formed in one piece from a curved and bent metal sheet.

In one embodiment, the second longitudinal side of the top foil is connected to an annular flange which projects beyond the second end side and on which the second holding lug is formed. The top foil and the flange are part of a top foil arrangement, as described above. The second longitudinal side of the bump foil is connected to a further annular flange which projects beyond the second end side and engages in the second holding lug. The bump foil and the further flange are part of a bump foil arrangement which, except for the missing second holding lugs, has a similar form to the top foil arrangement. The further ring is held by the second holding lugs, with the result that the top foil arrangement and the bump foil arrangement are connected to one another and their foils are aligned in relation to one another in a predefined way.

In one embodiment, the first holding lug of the top foil is arranged on the first holding lug of a bump foil. The foils with the holding lugs in the same depression extend in the same direction and may largely overlap. In an alternative embodiment, the first holding lug of the top foil is arranged on the first holding lug of a further bump foil. The foils with the holding lugs in the same depression extend in different directions. Nevertheless, the further bump foil is also arranged between the top foil and the inner wall, albeit with a smaller overlap region than in the previous embodiment.

In one embodiment, the depressions of the first and, if present, the second end side are in the form of grooves, projecting outwards from the cutout, in the first and second end side, respectively. The groove extends as an axial depression in the form of a trench on the end side from the inside outwards. The axial walls of the groove block a rotational movement of the engaging holding lugs.

In one embodiment, a shoulder region, which rises axially above a bottom of the depression and projects into the acute angle of the holding lug, is formed between the depression and the cutout-side edge of the end side. This shoulder region may be formed on the first and/or the second end side and prevents a radial movement of the holding lug inwards.

In one embodiment, the at least one foil and the first and the second holding lug are formed in one piece as a single component. The holding lugs are bent foil regions, wherein the end regions are angled in relation to the axial direction. The axial direction extends through the cutout and corresponds to the axis of rotation of the rotating component.

In one embodiment, the top foil has both a first and a second holding lug that engage around the bump foil on the longitudinal side, which bump foil may likewise, but does not have to, comprise holding lugs.

The radial air bearing device may have more than one top foil and more than one bump foil, wherein the top foils and the bump foils are each arranged offset along segment portions on the inner wall. This results on further degrees of freedom in the design of the radial air bearing device.

The holding lugs of the top foil and the bump foil arranged below it do not necessarily have to engage in the same depressions if both foils have a holding lug on the same longitudinal side. If the holding lugs of a top foil and a bump foil engage in the same depression, the top foil and the bump foil may also extend in different directions, that is to say on the one hand clockwise and on the other hand anticlockwise. In this case, the top foil and the bump foil overlap only in the region of the depression.

The connection described above between the bearing receptacle and the foils is a readily implementable and cost-effective approach for securing foils. The foils can be secured in the bearing receptacle easily and quickly. Furthermore, the components can be disassembled again, by contrast to conventional welded connections. Nevertheless, in one embodiment the holding lugs may also be secured fixedly, for example by weld points.

BRIEF DESCRIPTION OF THE DRAWINGS

A number of exemplary embodiments will be discussed in more detail below on the basis of the drawing, in which.

In the figures, components that are identical or have the same function are provided with the same reference signs.

DETAILED DESCRIPTION

Figure 1:
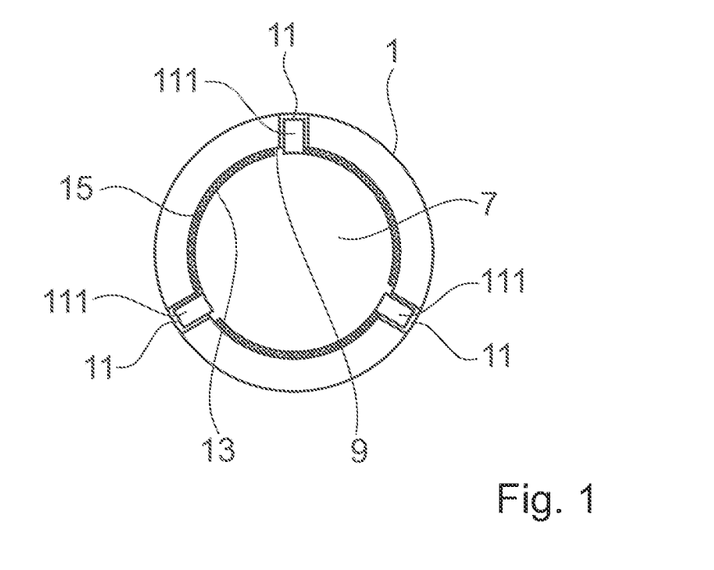
FIG. 1 shows a front view of an exemplary embodiment of a radial air bearing device.

FIG. 1 shows a front view of an exemplary embodiment of a radial air bearing device.

The radial air bearing device has a bearing sleeve 1 as an exemplary embodiment of a bearing receptacle. The bearing sleeve 1 has a first end side 3, which is at the front and in the plane of the drawing, and a second end side 5, which is at the rear and is not visible in FIG. 1. The bearing sleeve 1 comprises a continuous circular cutout 7 with an inner wall 9, which extend between the first and the second end side 3, 5. In this exemplary embodiment, in the first end side 3 there are three depressions 11, which extend slot-like in the form of grooves radially from the cutout 7 to an outer side of the bearing sleeve 1 and are arranged equidistantly along the circumference of the cutout 7. The axial depressions 11 have a rectangular cross section.

The radial air bearing device comprises three curved top foils 13 in the form of circular segments and three curved surrounding bump foils 15, which are in the form of circular segments and are arranged between the inner wall 9 and the top foils 13. The top foils 13 are arranged in the form of ring segments offset along the inner wall 9 of the cutout 7, with the result that they enclose the cutout 7. The bump foils 15 are also arranged in the form of ring segments offset along the inner wall 9 of the cutout 7. The bump foils 15 are elastically deformable in a radial direction. In this exemplary embodiment, they have a corrugated cross section.

The top foils 13 have a rectangular basic shape, which is curved in the form of a circular segment. Each top foil 13 has a first longitudinal side 103 adjacent to the first end side 3 and a second longitudinal side 105, which is situated opposite the first longitudinal side 103 and adjacent to the second end side 5. A first transverse side 107 and a second transverse side 109 extend axially between the first and the second end side 3, 5 perpendicularly in relation to the longitudinal sides 103, 105. An inner main side 115 faces away from the inner wall 9, and an outer main side faces towards the inner wall 9. Each top foil 15 has a first longitudinal side adjacent to the first end side 3 and a second longitudinal side, which is situated opposite the first longitudinal side and adjacent to the second end side 5. A first transverse side and a second transverse side extend axially between the first and the second end side 3, 5 perpendicularly in relation to the longitudinal sides. An inner main side faces away from the inner wall 9, and an outer main side faces towards the inner wall 9.

A first holding lug 111, which projects beyond the basic shape, is provided on the first longitudinal side 103 of each top foil 13. It is aligned on one of the transverse sides 107, 109, has a rectangular basic shape and is bent, with the result that it engages in one of the depressions 11 on the first end side 3. A first holding lug 211 is also provided on the first longitudinal side of each bump foil 15. The first holding lugs 111, 211 of a top foil 113 and bump foil 115 pair arranged one on top of the other engage in the same depression 11. The first holding lugs 111, 211 engaging in the depressions 11 secure the top foils 13 and the bump foils 15 in their positions. Lateral edges of the depression 11 prevent an angular movement of the first holding lugs 111, 211. This effect is assisted by friction between the depression 11 on the end side and the first holding lugs 111, 211. Apart from play in the angular direction between the first holding lugs 111, 211 and the depression 11, the top foils 13 and the bump foils 15 cannot be displaced along the circumference of the cutout 7.

In one exemplary embodiment, second holding lugs 113, which engage in further depressions 12 on the second end side 5, are provided on the second longitudinal side 105 of the top foils 13 and/or the bump foils 15. In an alternative exemplary embodiment, no second holding lugs 113 are provided on the second longitudinal sides 105 of the top foils 13 or bump foils 15.

The top foils 13 surround a rotating component (not illustrated in FIG. 1), for example a shaft. If the shaft begins to rotate about an axis of rotation, an air cushion begins to build up between the outer surface of the shaft and the inner main sides 115 of the top foils 13, so that the top foils 13 lift off from the shaft counter to the pressure of the bump foils 15 and the shaft is mounted in a virtually wear-free manner on the air cushion.

Figure 2:
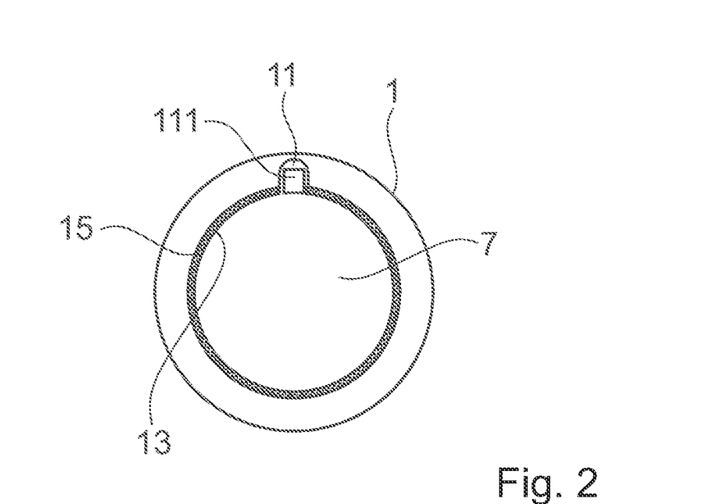
FIG. 2 shows a front view of a further exemplary embodiment of a radial air bearing device.

FIG. 2 shows a front view of a further exemplary embodiment of a radial air bearing device with a bearing sleeve 1 as an exemplary embodiment of a bearing receptacle. In order to avoid repetitions, the description will concentrate on differences in relation to the preceding exemplary embodiment. In the first end side 3, a depression 11 extends radially outwards from the cutout 7. In this exemplary embodiment, the depression 11 is not formed continuously outwards through the bearing sleeve 1.

Instead of in a bearing sleeve 1, the cutout 7 and the depressions 11, 12 may be provided in a housing as an exemplary embodiment of a bearing receptacle, and the cutout 7 and the depressions 11, 12 are arranged in this housing in the same way as described above. Such a cutout 7 in a housing may for example be in the form of a drilled hole in a supercharger housing.

The exemplary embodiment in FIG. 2 also differs from the preceding exemplary embodiment in that only one top foil 13 and one bump foil 15 are provided. The top foil 15 extends annularly along the inner wall 9 of the cutout 7. The bump foil 15 extends annularly between the inner wall 9 and the top foil 13. The top foil 13 and/or the bump foil 15 are held by at least one first holding lug 111, 211, which engages in the depression 11. A further depression 12, in which a second holding lug 113 of the top foil 13 and/or the bump foil 15 engages, may be provided on the second end side 5, opposite the depression 11.

Figure 3:
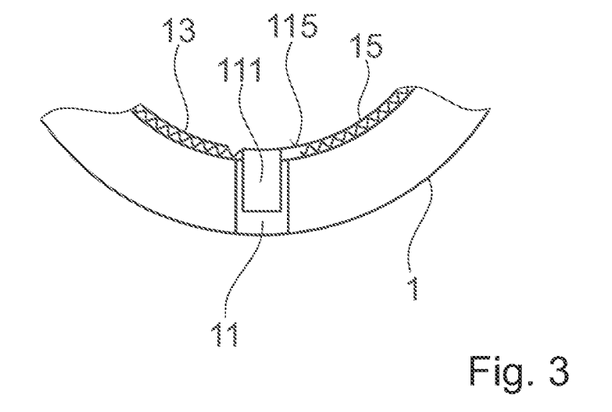
FIG. 3 shows a detail of a front view of a further exemplary embodiment of a radial air bearing device.

FIG. 3 shows a front view of a detail of a further exemplary embodiment of a radial air bearing device with a depression 11 in a first end side 3.

The radial air bearing device has a bearing sleeve 1 with a depression 11, as already described in connection with FIG. 1. At least one top foil 13 and one bump foil 15 are arranged on an inner wall 9 of a cutout 7. The first holding lugs 111, 211 of the top foil 13 and the bump foil 15 engage in the depression 11, wherein the first holding lug 111 of the top foil 13 engages over the first holding lug 211 of the bump foil 15, with the result that it is positioned between the first holding lug 111 of the first top foil 13 and the depression 11. In this exemplary embodiment, the top foil 13 and the bump foil 15 of which the first holding lugs 111, 211 engage in the same depression 11 extend in opposite directions, for example in that the top foil 13 extends anticlockwise and the bump foil 15 extends clockwise. This results in the inner wall 9 being covered all over along the circumference of at least one of the foils 13, 15, even though multiple top foils 13 and bump foils 15 are provided.

If multiple top foils 13 and bump foils 15 which are arranged offset are provided, the holding lugs of a top foil 13 and the bump foil 15 arranged below it do not engage in the same depressions if the foils both have at least one holding lug. Since the top foil and the bump foil which engage in the same depression extend in different directions, that is to say on the one hand anticlockwise and on the other hand clockwise, they overlap only in the region of the depression.

Figure 4:
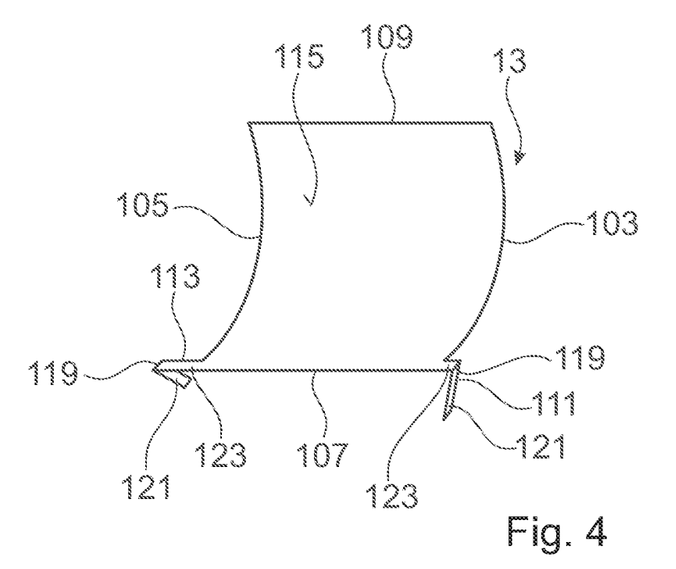
FIG. 4 shows an exemplary embodiment of a top foil.

FIG. 4 shows a three-dimensional illustration of an exemplary embodiment of a curved top foil 13, which has an inner main side 115 and an outer main side. The top foil 13 has a first longitudinal side 103 and a second longitudinal side 105 situated opposite it. A first and a second transverse side 107, 109 extend axially, perpendicularly in relation to the longitudinal sides 103, 105. The top foil 13 has a first holding lug 111 on the first longitudinal side 103 and an oppositely situated second holding lug 113 on the second longitudinal side 105. The holding lugs 111, 113 are aligned on the first transverse side 107 and are rectangular, bent foil regions projecting beyond the longitudinal sides 103, 105. The top foil 13 may be formed by punching the foil shape out of a flat metal sheet and then bending the holding lugs 111, 113 towards the outer main side 117. The basic area can be curved during or prior to installation in the bearing receptacle 1.

The first holding lug 111 and the second holding lug 113 have a bend edge 119 between an end region 121 and a region 123 close to the bearing receptacle. The regions 123 close to the bearing receptacle extend axially and the end regions 121 extend at an angle thereto, wherein the angles between the end regions 121 and the regions 123 close to the bearing receptacle are acute angles, that is to say less than 90 degrees. The region 123 of the second holding lug 113 that is close to the bearing receptacle is longer than the region 123 of the first holding lug 111 that is close to the bearing receptacle. The end region 121 of the second holding lug 113 is shorter than the end region 121 of the first holding lug 111. The holding lugs 111, 113 shaped asymmetrically in this way can be shaped from previously straight holding lugs 111, 113 of the same length by virtue of the different positions of the bend edges 119.

Before mounting, the end regions 121 are bent at an acute angle, and the top foil 13 may, but does not have to, be curved in the form of a circular segment, as illustrated in FIG. 4. The holding lugs 111, 113 are elastically deformable clips in which the end regions 121 can be moved towards and away from the outer main side, and as a result the angle between the region 123 close to the bearing receptacle and the end region 121 can be decreased or increased.

An exemplary embodiment of a bump foil 15 may be formed substantially like the top foil 13 described above, although its base area is corrugated between the longitudinal sides.

Alternative exemplary embodiments of foils have holding lugs on the second transverse side or on only one or none of the longitudinal sides.

Figure 5:
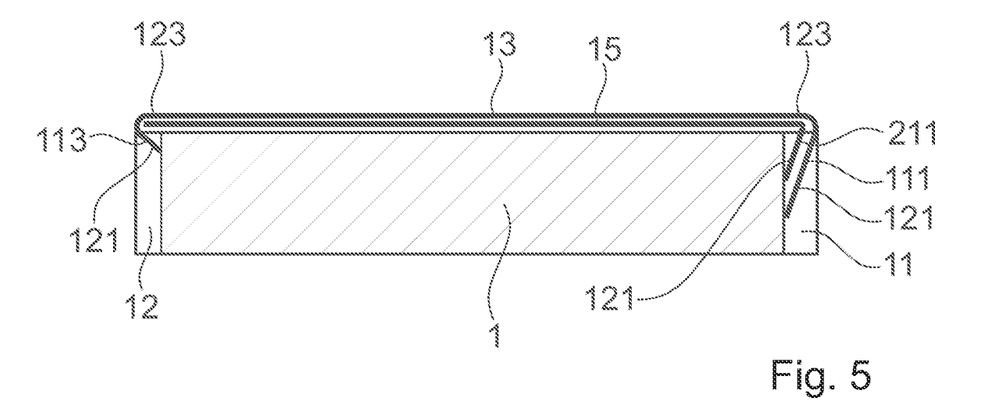
FIG. 5 shows a detail of a sectional view of a further exemplary embodiment of a radial air bearing device.

FIG. 5 shows a sectional view of a detail of the bearing receptacle 1 with a top foil 13 and the bump foil 15 in the region of the holding lugs 111, 113. The bearing receptacle 1 has a first depression 11 on its first end side 3 and a second depression 12 on its oppositely situated second end side 5. The depressions 11, 12 are arranged axially opposite one another.

The bump foil 15 is arranged between the inner wall 9 and the top foil 13. The top foil 13 has a first and a second bent holding lug 111, 113, which engage in the first and the second depression 11, 12, respectively. The top foil 13 and the bump foil 15 may extend in the same or in different directions.

A bend edge 119 extends parallel to the longitudinal sides 103, 105 between a region 123 close to the bearing receptacle and an end region 121 of the holding lugs 111, 113. The regions 123 close to the bearing receptacles extend axially. The region 123 of the second holding lug 113 that is close to the bearing receptacle is advantageously longer than the region 123 of the first holding lug 111 that is close to the bearing receptacle.

The end regions 121 extend at an acute angle in relation to the end sides 3, 5 and rest on them. On account of the spring action of the elastically deformed holding lugs 111, 113 and owing to their engagement in the depressions 11, 12, a force-fitting and form-fitting connection which prevents angular movements and axial movements of the foils 13, 15, except for play is formed.

In this exemplary embodiment, the bump foil 15 has only one bent holding lug 211. It is in the form of a first holding lug 211 on the first longitudinal side and engages in the depression 11 on the first end side 3. The first holding lug 111 of the top foil 13 engages over the first holding lug 211 of the bump foil 15. The second holding lug 113 of the top foil 13 engages around the longitudinal side of the bump foil 15. A bump foil 15 with only one holding lug 211 facilitates mounting. Nevertheless, the bump foil 15 is securely held in its position by the holding lugs 111, 113 of the top foil 13.

The top foil 13 is mounted in that the end region 121 of the second holding lug 113 is moved towards the region 123 close to the bearing receptacle and the angle virtually disappears. With the end region 121 folded in, the top foil 13 with the second longitudinal side 105 leading is pushed axially into the cutout 7, with the result that the end region 121 is moved over the inner wall 9 and thereby compresses the second holding lug 113. The top foil 13 is pushed into the cutout 7 until the end region 121 has been pushed out over the cutout edge on the second end side 5 and the end region 121 of the elastically deformed second holding lug 113 unfolds and moves radially outwards owing to the spring tension. While the end region 121 is being pushed out over the cutout edge on the second end side 5, the end region 121 of the first holding lug 111 is pressed against the first end side 3, with the result that it elastically deforms and the angle between the end region 121 and the region 123 close to the bearing receptacle is increased. As soon as the end region 121 of the second holding lug 113 is unfolded, the top foil 13 experiences a slight axial backwards movement, which moves it into its final position in the cutout 7, owing to the spring tension of the first holding lug 11. As soon as the end regions 121 of the two holding lugs 111, 113 rest on the end sides 3, 5, the spring tensions of the first and the second holding lug 111, 113 cause the top foil 13 to be force-fittingly held in the bearing receptacle 1. The depressions 11, 12 prevent angular displacements.

Before or together with the top foil 13 arranged thereon, the bump foil 15 is pushed axially into the cutout 7 with the second longitudinal side leading, until the first holding lug 211 of the bump foil 15 engages in the depression 11 on the first end side 3. The holding lugs 111, 113 of the top foil 13 engage around the bump foil 15. The holding lugs 111, 113 of the top foil 13 are matched to the bump foil 15 in terms of the positions of the bend edges 119 so that the bump foil 15 is pushed into its predefined position between the bend edges 119 between the bent holding lugs 111, 113 of the top foil 13 and held in place.

In this exemplary embodiment, the bump foil 15 has a holding lug 211 only on one longitudinal side. In a further exemplary embodiment, no holding lugs are provided on the bump foil 15. In a further exemplary embodiment, first and second holding lugs are provided on the bump foil 15.

If provided, the first and second holding lugs of the bump foil 15 are deformed upon insertion in the same way as described above in connection with the top foil 13. The top foil 13 and the bump foil 15 may be mounted at the same time by moving them into the cutout 7 one on the other until the holding lugs 111, 113, 211 latch in. If both the top foil 13 and the bump foil 15 have holding lugs on the same longitudinal side, they may be arranged one on the other already during the mounting.

As an alternative to holding lugs 111, 113, 211 in the form of clips that unfold automatically during mounting owing to their spring tension, holding lugs which are bent after mounting can be used. Such holding lugs are bent, for example at right angles, in the mounted state and rest on a large area of the end sides 3, 5, with the result that friction compensates for the lack of spring tension. An exemplary embodiment in which both holding lugs as clips and holding lugs that were bent after mounting are provided is also conceivable.

Figure 6:
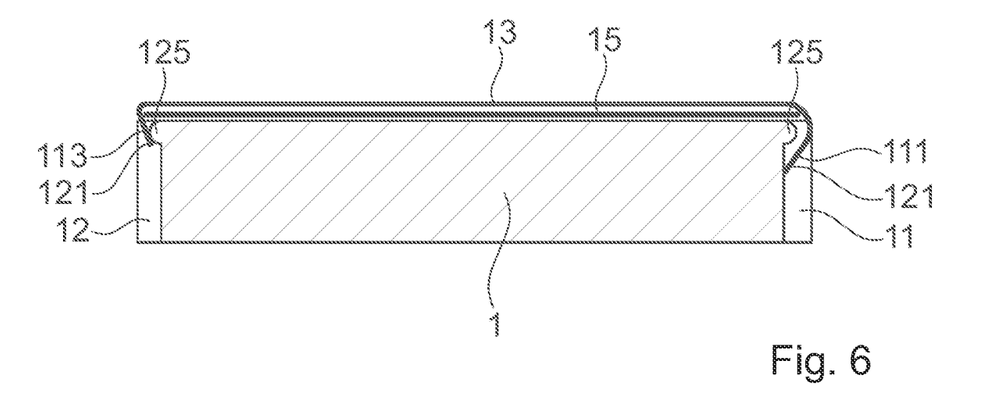
FIG. 6 shows a detail of a sectional view of a further exemplary embodiment of a radial air bearing device.

FIG. 6 shows a sectional view, in the region of the holding lugs 111, 113, of a detail of a further exemplary embodiment of a bearing receptacle with top foil 13 and bump foil 15. In order to avoid repetitions, the description will concentrate on differences in relation to the preceding exemplary embodiment.

In this exemplary embodiment, the first and the second depression 11, 12 have a edge region which is raised towards the cutout 7 and rises above a bottom of the depressions 11, 12, resulting in the formation of a shoulder 125. The end regions 121 of the holding lugs 111, 113 engage in the depressions 11, 12 over the shoulders 125, with the result that they are secured not just against rotational displacements relative to the bearing receptacle, but also against radial displacements.

The mounting is performed as described above, wherein the second holding lug 113 is pushed over the shoulder 125, and then unfolds and the end region 121 engages underneath the shoulder 125. The end region 121 of the first holding lug 111 also engages underneath the shoulder 125.

FIGS. 7 to 11 show views and components of a further exemplary embodiment of a radial bearing device with bump foils and top foils.

Figure 7:
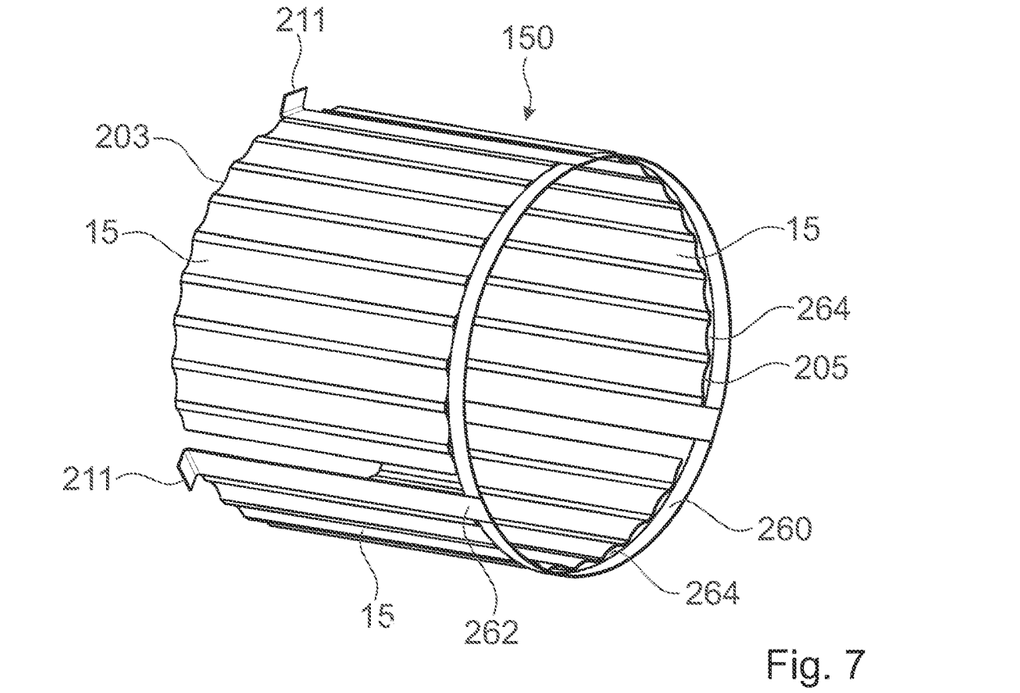
FIG. 7 shows a three-dimensional view of an exemplary embodiment of a bump foil arrangement.

FIG. 7 shows a three-dimensional view of a drum-like bump foil arrangement 150 with three bump foils 15 each having first and second longitudinal sides 203, 205. An annular flange 260, which is connected to the bump foils 15 via holding regions 262, extends along the second longitudinal sides 205. A narrow holding region 262, which connects the bump foil 15 to the flange 260, is provided flush with one of the transverse sides of each bump foil 15. A gap 264 extends between the bump foils 15 and the flange 260 on the far side of the holding regions 262. Axial gaps extend between the bump foils 15.

Bent first holding lugs 211, which extend approximately radially but still at an acute angle, are provided on the first longitudinal sides 203 of the bump foils 15. The first holding lugs 211 are situated opposite the holding regions 262. The bend points of the first holding lugs 211 are on the first longitudinal sides 203.

The bump foil arrangement 150 with the bump foils 15, the first holding lugs 211, the holding regions 262 and the flange 260 is formed in one piece as a single component. This can be done by punching it out from a metal sheet and then deforming it, during which the bump foils 15 receive their corrugated shape and are curved along with the flange 260.

Figure 8:
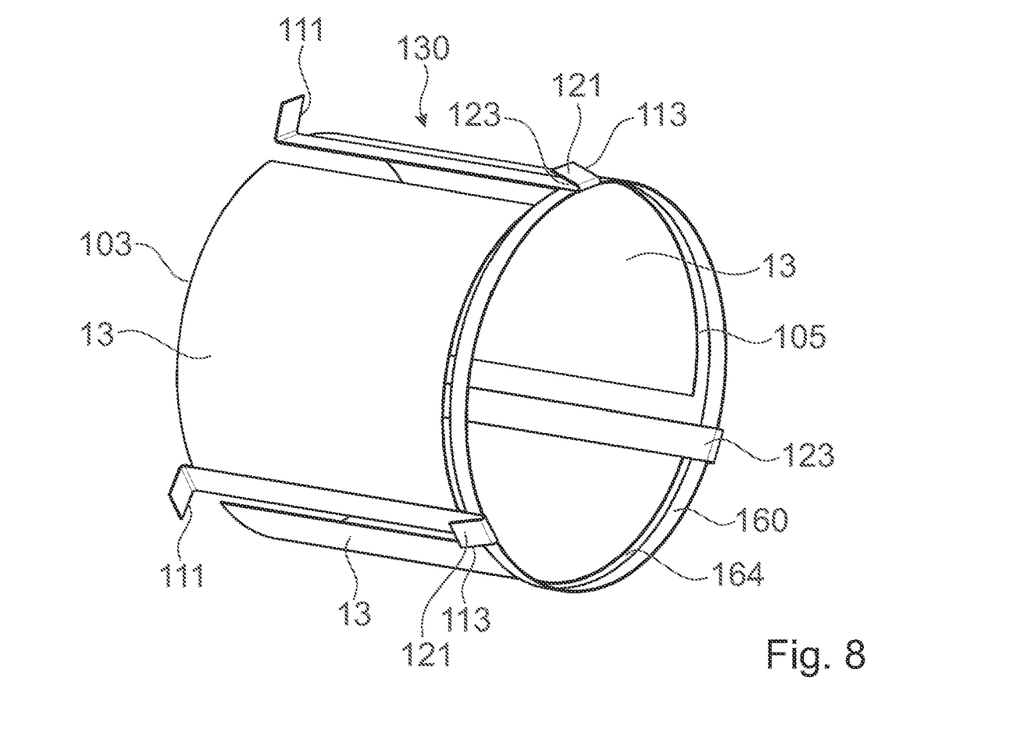
FIG. 8 shows a three-dimensional view of an exemplary embodiment of a top foil arrangement.

FIG. 8 shows a three-dimensional view of a drum-like top foil arrangement 130 having three top foils 13 with first and second longitudinal sides 103, 105 and an annular flange 160, which extends along the second longitudinal sides 105. There is a gap 164 between the flange 160 and the second longitudinal sides 105. Each second longitudinal side 105 is connected to the annular flange 160 via a second holding lug 113. The second holding lugs 113 are in the form of clips. The second holding lugs 113 each have a region 123 which is close to the bearing receptacle and leads into the flange 160, and an end region 121 which is bent over the flange 160 and the region 123 close to the bearing receptacle at an acute angle, wherein the flange 160 extends through the region 123 close to the bearing receptacle and at least partially forms that region.

Bent first holding lugs 111, which have a larger angle than the acute angle of the second holding lugs 113, are provided on the first longitudinal sides 103. The top foil arrangement 130 with the top foils 13, the first and second holding lugs 111, 113 and the flange 160 is formed in one piece as a single component. This can be done by punching it out from a metal sheet and then deforming it.

Figure 9:
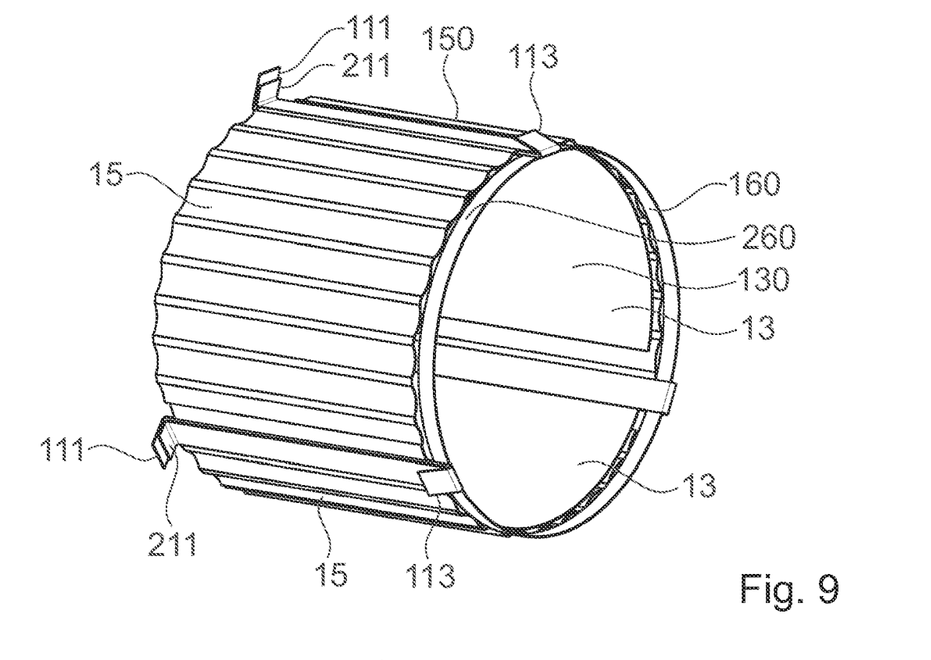
FIG. 9 shows the bump foil arrangement and the top foil arrangement.

FIG. 9 shows a three-dimensional view of the top foil arrangement 130 and the bump foil arrangement 150, which are pushed one in the other such that the bump foils 15 extend on the outside of the top foils 13. The top foil arrangement 130 extends annularly inside the bump foil arrangement 150, so that the top foils 13 and the bump foils 15 rest one on the other. The top foils 13 and the bump foils 15 are arranged with an angular offset in relation to one another; nevertheless, there is a large-area overlap. The flange 260 of the bump foil arrangement 150 extends through the two holding lugs 113 of the top foils 13, with the result that the holding regions 262 are pushed in the second holding lugs 113. The first holding lugs 111, 211 of the bump foil arrangement 150 and the top foil arrangement 130 are aligned in relation to one another such that they rest on one another.

Figure 10:
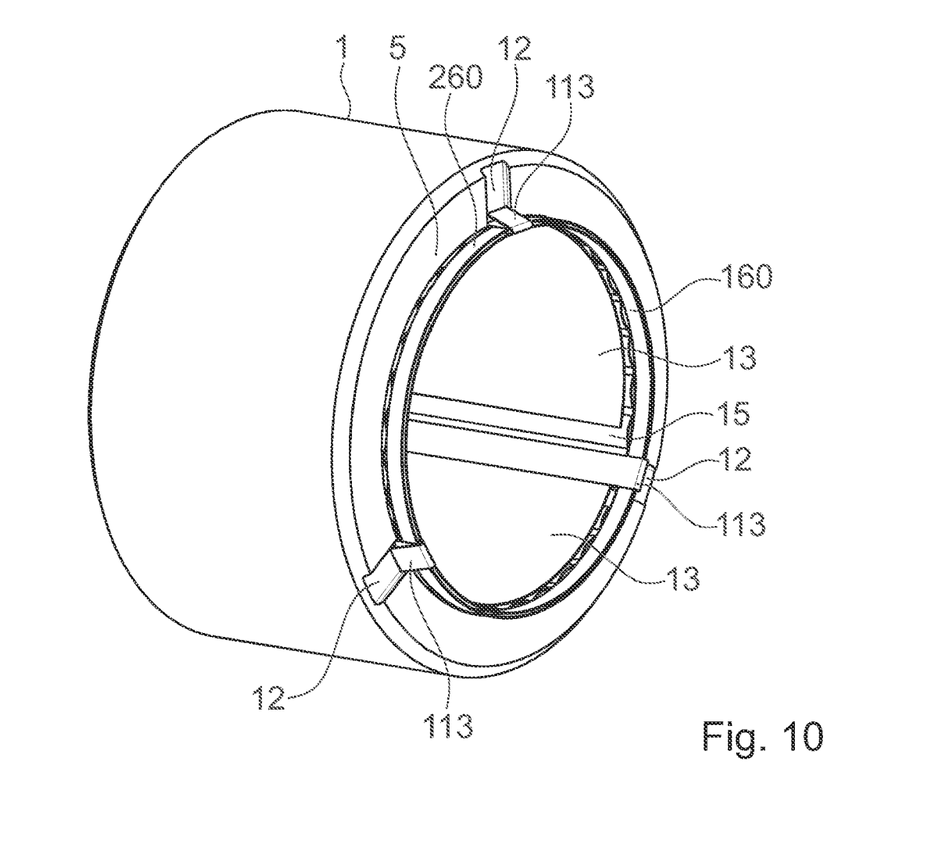
FIG. 10 shows a three-dimensional rear view of an exemplary embodiment of a radial air bearing device.

FIG. 10 shows a three-dimensional rear view of the radial air bearing device with a bearing receptacle 1 in which the bump foil arrangement 150 and the top foil arrangement 130 are inserted, as described above in connection with FIG. 9. The bump foil arrangement 150 and the top foil arrangement 130 are pushed into the cutout 7 of the bearing receptacle, which is in the form of a bearing bush 1, together during the mounting. In the process, the second holding lugs 113 are elastically deformed.

The flanges 260, 160 of the bump foil arrangement 150 and the top foil arrangement 130 project, like the second holding lugs 113, beyond the second end side 5. The flange 260 of the bump foil arrangement 150 projects into the two holding lugs 113. The end regions 121 of the second holding lugs 113 engage in depressions 12 on the second end side 5, wherein the edges of the end regions 121 that face towards the second end side 5 may, but do not have to, rest in the depressions 12. The flange 260 of the bump foil arrangement 150 is pushed between the end region 121 and the region 123 that is close to the bearing receptacle. In one exemplary embodiment, this makes it possible to pretension the second holding lug 113 and deform it slightly by way of the flange 260. In an alternative exemplary embodiment, there is no deformation by the flange 260 between the end region 121 and the region 123 that is close to the bearing receptacle.

Figure 11:
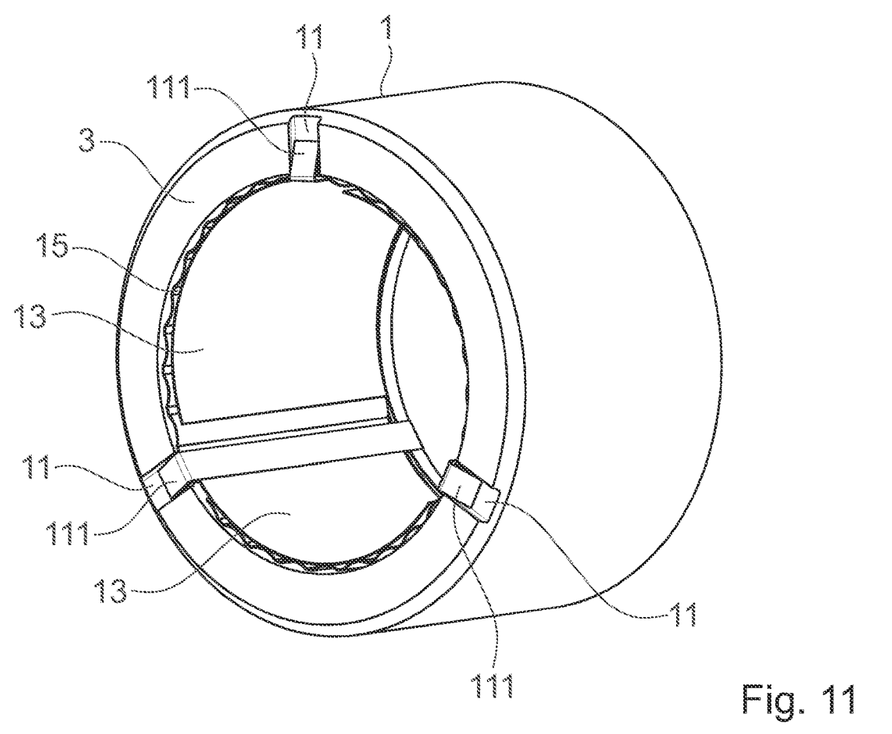
FIG. 11 shows a three-dimensional front view of the radial air bearing device.

FIG. 11 shows a three-dimensional front view of the radial air bearing device from FIG. 10. The first holding lugs 111, 211 engage in trench-like depressions 11 on a first end side 3 of the bearing bush 1, wherein the first holding lugs 211 of the bump foil arrangement 150 are between the depressions 11 and the first holding lugs 111 of the top foils 130.

The holding lugs 111, 211, 113 may be elastically deformed and rest on the end sides 3, 5. As an alternative, they engage in the depressions 11, 12 without being elastically deformed. In one exemplary embodiment, the holding lugs 111, 211, 113 may be dimensioned such that they have play and the end sides 3, 5 do not necessary touch, but an axial movement and angular movement are still prevented by the engagement in the depressions 11, 12.

Figure 12:
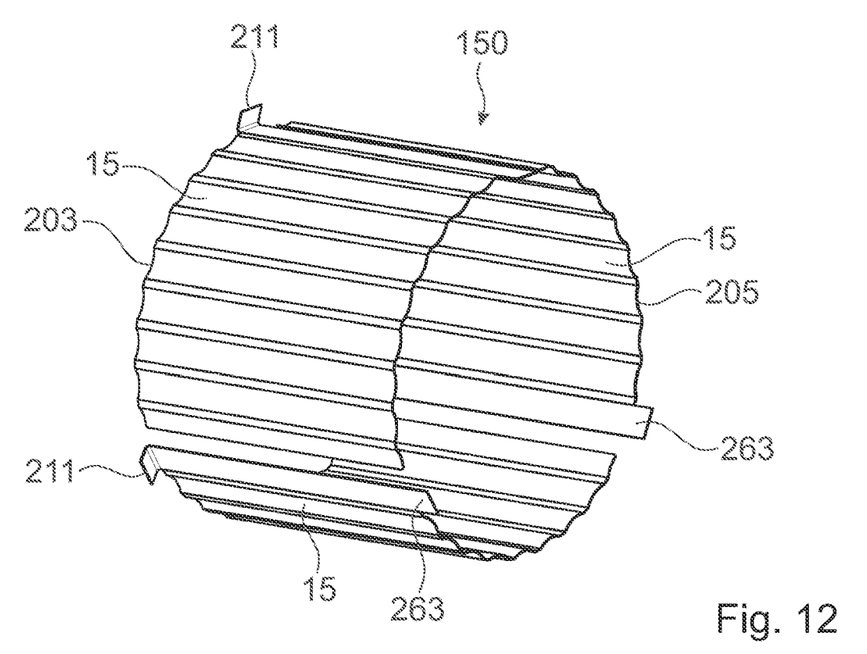
FIG. 12 shows a three-dimensional view of an exemplary embodiment of bump foils.
Figure 13:
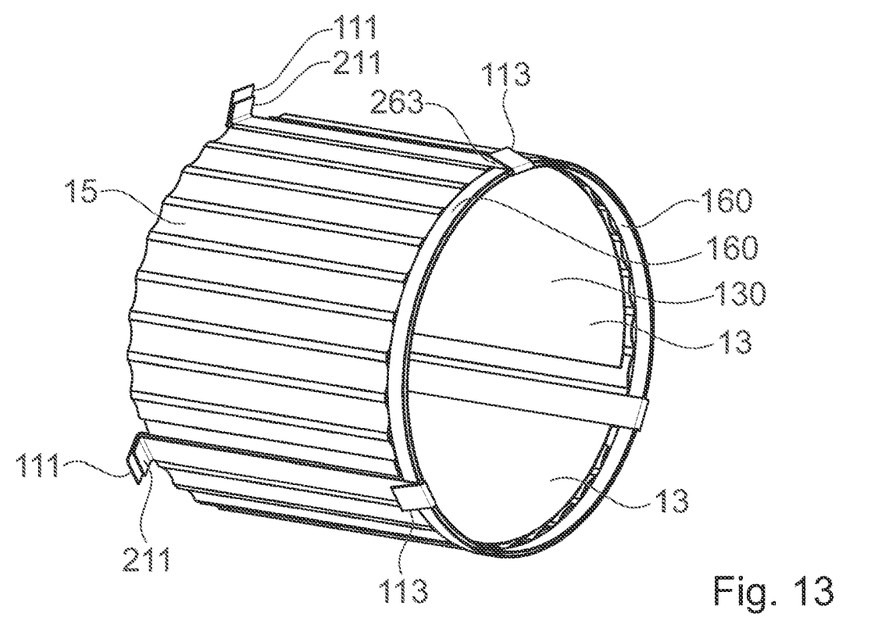
FIG. 13 shows the bump foils and the top foil arrangement.
Figure 14:
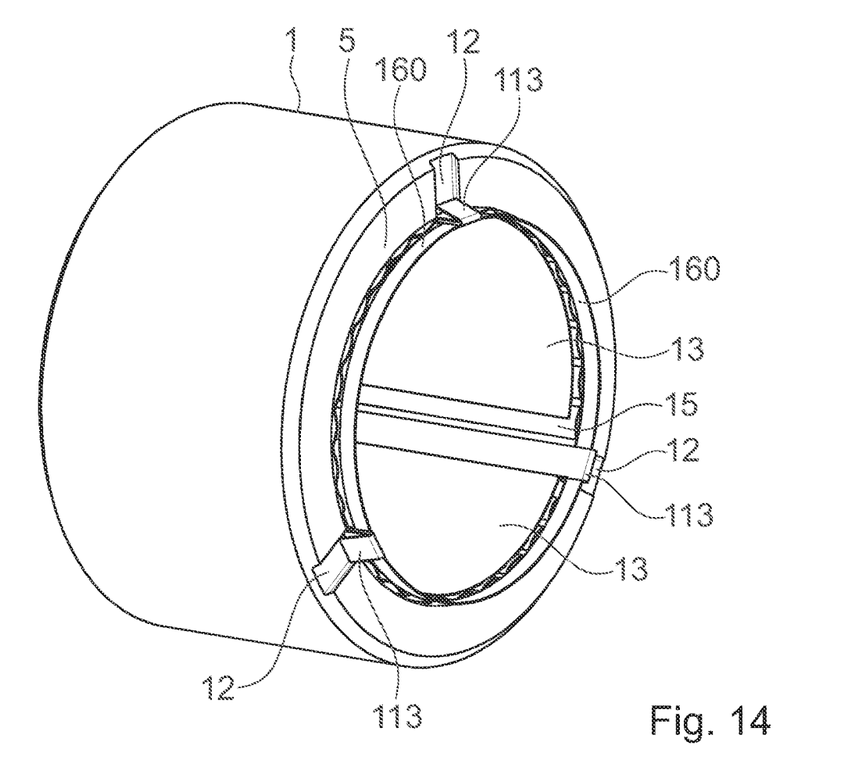
FIG. 14 shows a three-dimensional rear view of a further exemplary embodiment of a radial air bearing device.

FIGS. 12 to 14 show views and components of a further exemplary embodiment of a radial bearing device with bump foils 15 and top foils 13. This exemplary embodiment differs from the preceding one in terms of the design of the bump foils 15.

FIG. 12 shows a three-dimensional view of the curved separate bump foils 15, which are not connected by a flange but instead have an axially projecting region 263 situated opposite the first holding lugs 211. The first holding lug 211 and the region 263 are arranged opposite one another on each bump foil 15 and aligned on one of the transverse sides.

FIG. 13 shows a three-dimensional view of a top foil arrangement 130 and the bump foils 15, which are pushed one in the other such that the bump foils 15 extend on the outside of the top foils 13. The top foil arrangement 130 has already been described in connection with FIG. 8. The axially projecting region 263 of the bump foils 15 extends into the second holding lugs 113 of the top foils 13. The first holding lugs 111, 211 of the bump foils 15 and the top foils 13 are aligned in relation to one another such that they rest on one another. However, the top foils and the bump foils of which the first holding lugs are aligned one on top of the other extend in different directions. As a result, the top foils 13 and the bump foils 15 are arranged with an angular offset in relation to one another; nevertheless, there is a large-area overlap.

FIG. 14 shows a three-dimensional rear view of the radial air bearing device with a bearing receptacle in which the bump foils 15 and the top foil arrangement 130 are inserted, as described above in connection with FIG. 13. The bump foils 15 and the top foil arrangement 130 are pushed into the cutout 7 of the bearing receptacle, which is in the form of a bearing bush 1, together during the mounting. In the process, the second holding lugs 113 are elastically deformed.

The flange 160 of the top foil arrangement 130 projects beyond the second end side 5 similarly to the second holding lugs 113 in which the protruding regions 263 of the bump foils 15 engage. The end regions 121 of the second holding lugs 113 engage in depressions 12 on the second end side 5, wherein the edges of the end regions 121 that face towards the second end side 5 may, but do not have to, rest in the depressions 12.

The front view of the radial air bearing device corresponds to the view already described in connection with FIG. 11.

In one exemplary embodiment, the holding lugs 111, 211, 113 may be dimensioned such that they have play and the end sides 3, 5 do not necessary touch, but an axial movement and angular movement are still prevented by the engagement in the depressions 11, 12.

The features specified above and in the claims and shown in the figures can be advantageously implemented both individually and in various combinations. The invention is not restricted to the exemplary embodiments described, but may be modified in various ways within the scope of the abilities of a person skilled in the art.

REFERENCE SIGNS

1 Bearing receptacle
3, 5 End side
7 Cutout
9 Inner wall
11, 12 Depression
13 Top foil
15 Bump foil
103, 105, 203, 205 Longitudinal side
105, 107 Transverse side
111, 113, 211 Holding lug
115 Main side
119 Bend edge
121 End region
123 Region
125 Shoulder
130 Top foil arrangement
150 Bump foil arrangement
160, 260 Flange
164, 264 Gap
262 Holding region
263 Region

What is claimed is:
1. A radial air bearing device comprising:
a bearing receptacle comprising a first end side, which contains a first depression, and a second end side, and a cutout with an inner wall, wherein the cutout and the inner wall extend between the first and the second end side, a top foil, which is arranged along the inner wall and comprises a first longitudinal side adjacent to the first end side and a second longitudinal side adjacent to the second end side, a bump foil, which is arranged between the top foil and the inner wall and comprises a first longitudinal side adjacent to the first end side and a second longitudinal side adjacent to the second end side, wherein at least one foil from the group comprising the top foil and the bump foil comprises a first holding lug which is on a longitudinal side, is bent in relation to the first end side, and engages in the first depression, and wherein the first holding lug is arranged on the first longitudinal side and has a region adjacent to the bearing receptacle, and the bend point is between the end region and the region adjacent to the bearing receptacle, and wherein the first holding lug has a lesser acute angle numerical value between the end region and the region adjacent to the bearing receptacle when relieved of tension when the first holding lug has been inserted in the bearing receptacle than a corresponding acute angle numerical value between the end region and the region adjacent to the bearing receptacle prior to when the first holding lug has been inserted in the bearing receptacle.

2. The radial air bearing device according to claim 1, wherein the at least one foil further comprises a second holding lug which is on a longitudinal side and is bent in relation to the second end side.

3. The radial air bearing device according to claim 2 having a second depression in the second end side, in which the second holding lug engages.

4. The radial air bearing device according to claim 2,
wherein the first holding lug has a bend point, at which an end region of the first holding lug is bent at right angles or an acute angle in relation to the first end side, and/or
wherein the second holding lug has a bend point, at which an end region of the second holding lug is bent at right angles or an acute angle in relation to the second end side.

5. The radial air bearing device according to claim 2,
wherein the first holding lug is elastically deformable, with the result that it can be deformed upon insertion into the bearing receptacle, and/or
wherein the second holding lug is elastically deformable, with the result that it can be deformed upon insertion into the bearing receptacle.

6. The radial air bearing device according to claim 2,
wherein the first holding lug is pretensioned when it has been inserted in the bearing receptacle, and/or
wherein the second holding lug is pretensioned when it has been inserted in the bearing receptacle.

7. The radial air bearing device according to claim 2,
wherein the second holding lug is arranged on the second longitudinal side and has a region adjacent to the bearing receptacle, and the bend point is between the end region and the region adjacent to the bearing receptacle, and wherein the second holding lug has a lesser acute angle numerical value between the end region and the region adjacent to the bearing receptacle when relieved of tension than a corresponding acute angle numerical value between the end region and the region adjacent to the bearing receptacle prior to when the second holding lug has been inserted in the bearing receptacle.

8. The radial air bearing device according to claim 7, wherein the region of the second holding lug that is adjacent to the bearing receptacle is longer than the region of the first holding lug that is adjacent to the bearing receptacle.

9. The radial air bearing device according to claim 2, wherein the second longitudinal side of the at least one foil is connected to an annular flange, which projects beyond the second end side and on which the second holding lug is formed.

10. The radial air bearing device according to claim 9, wherein the second longitudinal side of the top foil is connected to an annular flange, which projects beyond the second end side and on which the second holding lug is formed, and wherein the second longitudinal side of the bump foil is connected to an annular flange, which projects beyond the second end side and engages in the second holding lug.

11. The radial air bearing device according to claim 3, wherein the first depression and/or the second depression is in the form of a groove, projecting outwards from the cutout, in the first and/or second end side, respectively.

12. The radial air bearing device according to claim 3,
wherein a shoulder region, which rises axially above a bottom of the first depression and projects into an acute angle of the first holding lug, is formed between the first depression and a cutout-side edge of the first end side, and/or
wherein a shoulder region, which rises axially above a bottom of the second depression and projects into an acute angle of the second holding lug, is formed between the second depression and the cutout-side edge of the second end side.

13. The radial air bearing device according to claim 1, wherein the at least one foil and the first holding lug are formed in one piece as a single component.

14. The radial air bearing device according to claim 2, wherein the first holding lug of the top foil is arranged on the first holding lug of the bump foil or a further bump foil.

15. The radial air bearing device according to claim 1, wherein more than one top foil and more than one bump foil, each arranged arcuately offset along segment portions on the inner wall, are provided.

16. The radial air bearing device according to claim 3,
wherein the first holding lug has a bend point, at which an end region of the first holding lug is bent at right angles or an acute angle in relation to the first end side, and/or
wherein the second holding lug has a bend point, at which an end region of the second holding lug is bent at right angles or an acute angle in relation to the second end side.

17. The radial air bearing device according to claim 2, wherein the at least one foil and the first and the second holding lug are formed in one piece as a single component.

18. A radial air bearing device comprising:
a bearing receptacle comprising a first end side, which contains a first depression, and a second end side, and a cutout with an inner wall, wherein the cutout and the inner wall extend between the first and the second end side,
a top foil, which is arranged along the inner wall and comprises a first longitudinal side adjacent to the first end side and a second longitudinal side adjacent to the second end side,
a bump foil, which is arranged between the top foil and the inner wall and comprises a first longitudinal side adjacent to the first end side and a second longitudinal side adjacent to the second end side,
wherein at least one foil from the group comprising the top foil and the bump foil comprises a first holding lug which is on a longitudinal side, is bent in relation to the first end side, and engages in the first depression, wherein the at least one foil comprises a second holding lug which is on a longitudinal side and is bent in relation to the second end side, and wherein the second longitudinal side of the at least one foil is connected to an annular flange, which projects beyond the second end side and on which the second holding lug is formed.

19. A radial air bearing device comprising:

a bearing receptacle comprising a first end side, which contains a first depression, and a second end side, and a cutout with an inner wall, wherein the cutout and the inner wall extend between the first and the second end side, a top foil, which is arranged along the inner wall and comprises a first longitudinal side adjacent to the first end side and a second longitudinal side adjacent to the second end side, a bump foil, which is arranged between the top foil and the inner wall and comprises a first longitudinal side adjacent to the first end side and a second longitudinal side adjacent to the second end side, a second depression in the second end side in which the second holding lug engages, wherein at least one foil from the group comprising the top foil and the bump foil comprises a first holding lug which is on a longitudinal side, is bent in relation to the first end side, and engages in the first depression, wherein the at least one foil comprises a second holding lug which is on a longitudinal side and is bent in relation to the second end side, wherein a shoulder region, which rises axially above a bottom of the first depression and projects into an acute angle of the first holding lug, is formed between the first depression and a cutout-side edge of the first end side, and/or wherein a shoulder region, which rises axially above a bottom of the second depression and projects into an acute angle of the second holding lug, is formed between the second depression and the cutout-side edge of the second end side.

\* \* \* \* \*

UNITED STATES PATENT AND TRADEMARK OFFICE
CERTIFICATE OF CORRECTION

PATENT NO. : 12,486,866 B2
APPLICATION NO. : 18/524797
DATED : December 2, 2025
INVENTOR(S) : Marcel Berrang et al.

Page 1 of 1

It is certified that error appears in the above-identified patent and that said Letters Patent is hereby corrected as shown below:

In the Claims

Claim 1, Column 13, Line 15, delete the first occurrence of "the" and replace with -- a -- before 'bend point'
Claim 1, Column 13, Line 15, delete the second occurrence of "the" and replace with -- an -- after 'between'

Claim 4, Column 13, Line 34, delete "a" and replace -- the -- before 'bend point'
Claim 4, Column 13, Line 34, delete "an" and replace with -- the -- after 'which'

Claim 7, Column 13, Line 56, delete the first occurrence of "the" and replace with -- a -- before 'bend point'
Claim 7, Column 13, Line 56, after 'bend point', add -- of the second holding lug --
Claim 7, Column 13, Line 56, delete the second occurrence of "the" and replace with -- an -- after 'between'
Claim 7, Column 13, Line 57, after 'end region', please add -- of the second holding lug --

Claim 16, Column 14, Line 42, delete "a" and replace with -- the -- before 'bend point'
Claim 16, Column 14, Line 42, delete "an" and replace with -- the -- after 'which'

Claim 19, Column 16, Line 3, delete the second occurrence of "the" and replace with -- a -- after 'which'
Claim 19, Column 16, Line 9, delete "a" and replace with -- the -- before 'second holding'

Signed and Sealed this
Third Day of February, 2026

John A. Squires
*Director of the United States Patent and Trademark Office*